United States Patent
Feenaughty et al.

(10) Patent No.: US 10,703,664 B2
(45) Date of Patent: Jul. 7, 2020

(54) ISOPIPE WITH CURB AT THE COMPRESSION END AND METHOD FOR FORMING A GLASS RIBBON

(71) Applicant: Corning Incorporated, Corning, NY (US)

(72) Inventors: John Michael Feenaughty, Arkport, NY (US); Shawn Rachelle Markham, Harrodsburg, KY (US)

(73) Assignee: Corning Incorporated, Corning, NY (US)

( * ) Notice: Subject to any disclaimer, the term of this patent is extended or adjusted under 35 U.S.C. 154(b) by 182 days.

(21) Appl. No.: 15/513,792

(22) PCT Filed: Sep. 30, 2015

(86) PCT No.: PCT/US2015/053075
§ 371 (c)(1),
(2) Date: Mar. 23, 2017

(87) PCT Pub. No.: WO2016/054130
PCT Pub. Date: Apr. 7, 2016

(65) Prior Publication Data
US 2019/0092673 A1    Mar. 28, 2019

Related U.S. Application Data

(60) Provisional application No. 62/057,416, filed on Sep. 30, 2014.

(51) Int. Cl.
*C03B 17/06* (2006.01)

(52) U.S. Cl.
CPC ............ *C03B 17/064* (2013.01); *Y02P 40/57* (2015.11)

(58) Field of Classification Search
CPC .................................................. C03B 17/064
See application file for complete search history.

(56) References Cited

U.S. PATENT DOCUMENTS 3,338,696 A * 8/1967 Dockerty ............ C03B 17/064
65/121
3,437,470 A * 4/1969 Overman ............ C03B 17/064
65/121

(Continued)

FOREIGN PATENT DOCUMENTS

CN    202808574 U    3/2013
CN    203212449 U    9/2013

(Continued)

OTHER PUBLICATIONS

PCT/US2015/053075 International Search Report and Written Opinion; dated Jan. 4, 2016; 13 pages.

(Continued)

*Primary Examiner* — Alison L Hindenlang (57) ABSTRACT

The disclosure relates to apparatuses for producing a glass ribbon, the apparatuses comprising a forming body (100) comprising an upper trough-shaped portion comprising two trough walls and a trough bottom; a lower wedge-shaped portion; a delivery end configured to receive molten glass; and a compression end (237) comprising a curb (243); and an end cap (205) coupled to the compression end (237) and extending over a top surface of the curb (243), wherein a height of the curb (243) is greater than a height of the two trough walls at a point proximate the compression end (237). Also disclosed herein are methods for producing a glass ribbon using such apparatuses. This minimizes glass flow into the end cap and over the compression end of the forming body and minimizes formations of gobs.

18 Claims, 8 Drawing Sheets

(56) References Cited

U.S. PATENT DOCUMENTS

| | | | | |
|---|---|---|---|---|
| 3,451,798 | A * | 6/1969 | Simon | C03B 17/064 65/121 |
| 3,537,834 | A * | 11/1970 | Simon | C03B 17/064 65/121 |
| 3,589,887 | A * | 6/1971 | Ward | C03B 17/064 65/121 |
| 3,682,609 | A * | 8/1972 | Dockerty | C03B 17/067 65/83 |
| 4,214,886 | A * | 7/1980 | Shay | C03B 17/02 65/121 |
| 6,748,765 | B2 * | 6/2004 | Pitbladdo | C03B 17/064 65/121 |
| 7,748,236 | B2 * | 7/2010 | Pitbladdo | C03B 17/064 65/193 |
| 8,720,225 | B2 * | 5/2014 | Pitbladdo | C03B 17/064 65/195 |
| 8,726,695 | B2 * | 5/2014 | Kano | C03B 18/06 65/91 |
| 8,794,034 | B2 * | 8/2014 | Grzesik | C03B 17/064 65/53 |
| 2005/0076677 | A1 * | 4/2005 | Pitbladdo | C03B 17/064 65/53 |
| 2005/0183455 | A1 * | 8/2005 | Pitbladdo | C03B 17/064 65/29.11 |
| 2005/0268657 | A1 * | 12/2005 | Adamowicz | C03B 17/064 65/53 |
| 2005/0268658 | A1 * | 12/2005 | Adamowicz | C03B 17/064 65/53 |
| 2005/0268659 | A1 * | 12/2005 | Rhoads | C03B 17/064 65/53 |
| 2006/0236722 | A1 * | 10/2006 | Delia | C03B 17/064 65/90 |
| 2008/0276649 | A1 | 11/2008 | Park | |
| 2010/0212359 | A1 * | 8/2010 | Godard | C03B 17/064 65/90 |
| 2010/0251774 | A1 * | 10/2010 | Peterson | C03B 5/1672 65/193 |
| 2012/0026632 | A1 | 2/2012 | Acharya et al. | |
| 2012/0111060 | A1 * | 5/2012 | Tsuda | C03B 17/064 65/53 |
| 2012/0266632 | A1 * | 10/2012 | Pitbladdo | C03B 17/064 65/29.11 |
| 2012/0272688 | A1 * | 11/2012 | Kano | C03B 18/06 65/195 |
| 2012/0304695 | A1 * | 12/2012 | Lakota | C03B 13/04 65/29.19 |
| 2013/0224465 | A1 | 8/2013 | Langensiepen et al. | |
| 2014/0318182 | A1 * | 10/2014 | Coppola | C03B 17/067 65/29.21 |
| 2015/0218028 | A1 * | 8/2015 | Tamamura | C03B 17/064 65/53 |
| 2016/0311198 | A1 * | 10/2016 | Boratav | B32B 17/06 |
| 2018/0044215 | A1 * | 2/2018 | Coppola | C03B 17/065 |
| 2018/0327299 | A1 * | 11/2018 | Coppola | C03B 17/02 |

FOREIGN PATENT DOCUMENTS

| | | |
|---|---|---|
| DE | 10229344 A1 | 2/2004 |
| JP | 59165423 U | 11/1984 |
| WO | 2013005409 A1 | 1/2013 |

OTHER PUBLICATIONS

English Translation of CN201580062346.7 Office Action dated Mar. 22, 2019; 12 Pages; Chinese Patent Office.
Japanese Patent Application No. 2017517012; Machine Translation of the Office Action dated Sep. 11, 2019; Japan Patent Office; 4 Pgs.
Indian Patent Application No. 201717010609; First Examination Report dated Oct. 22, 2019; India Patent Office; 5 Pgs.

* cited by examiner

ISOPIPE WITH CURB AT THE COMPRESSION END AND METHOD FOR FORMING A GLASS RIBBON

CROSS-REFERENCE TO RELATED APPLICATIONS

This application claims the benefit of priority under 35 U.S.C. § 365 of International Patent Application Serial No. PCT/US15/53075 filed on Sep. 30, 2015 designating the United States of America, which claims the benefit of priority to U.S. Provisional Application No. 62/057,416 filed Sep. 30, 2014 the content of which are incorporated herein by reference in their entirety.

FIELD OF THE DISCLOSURE

The present disclosure relates generally to forming bodies for glass manufacturing systems, and more particularly to isopipes for use in fusion draw machines.

BACKGROUND

High-performance display devices, such as liquid crystal displays (LCDs) and plasma displays, are commonly used in various electronics, such as cell phones, laptops, electronic tablets, televisions, and computer monitors. Currently marketed display devices can employ one or more high-precision glass sheets, for example, as substrates for electronic circuit components, or as color filters, to name a few applications. The leading technology for making such high-quality glass substrates is the fusion draw process, developed by Corning Incorporated, and described, e.g., in U.S. Pat. Nos. 3,338,696 and 3,682,609, which are incorporated herein by reference in their entireties.

The fusion draw process can utilize a fusion draw machine (FDM) comprising a forming body (e.g., isopipe). The forming body can comprise an upper trough-shaped portion and a lower portion having a wedge-shaped cross-section with two major side surfaces (or forming surfaces) sloping downwardly to join at a root. During operation, the trough is filled with molten glass, e.g., glass having a viscosity ranging from about 16,000 to about 75,000 poise, which is allowed to flow over the trough side walls (or weirs) and down along the two forming surfaces as two glass ribbons, which ultimately converge at the root where they fuse together to form a unitary glass ribbon. The glass ribbon can thus have two pristine external surfaces that have not been exposed to the surface of the forming body. The ribbon can then be drawn down and cooled to form a glass sheet having a desired thickness and a pristine surface quality.

During the glass forming process, molten glass can be delivered to one end of the isopipe ("delivery end") and can travel down the length of the isopipe while flowing over the weirs to an opposite end ("compression end"). Forming bodies such as isopipes are often constructed of refractory ceramic materials, such as zircon, zirconia, alumina, and the like, which can have a coefficient of thermal expansion (CTE) that can widely vary as compared to the CTE of metal components of the isopipe, such as the end cap and/or plow. For instance, platinum and platinum-containing alloys can expand about two times as much as zircon at elevated temperatures. The expansion differential between the two materials can cause gaps to form during operation.

At operating temperatures, gaps can form that are large enough for glass at lower viscosities to flow through, particularly during flushing procedures. The molten glass can then begin to collect in an end cap of the isopipe. Glass collected in the end cap can be inactive and relatively stable, but can eventually leak out if the end cap malfunctions. For instance, leaks in the end cap can be caused by contamination of the welds and/or deterioration of the metal, e.g., due to contact with certain materials such as SiC. In some instances, excess glass volume in the end cap can cause the metal to bulge and place stress on the weld lines and/or stretch already thinned areas of the end cap. Bulging of the end cap can also cause it to contact a structure enclosing the forming body, thereby forming holes in the end cap. Excessive glass volume in the end cap can also force it to slip off the forming body, or isopipe, entirely.

Glass leaking from the end cap on the compression end can flow down into the rest of the process, e.g., behind an edge director at the edges of the primary glass flow, and is referred to in the art as "gobs." Gobs can collect in size around the edge rolls below the root of the isopipe and can interfere with the pulling action. The gobs can also break off and cause glass pieces to get pinched between the glass and the lower rolls, which can result in significant glass breakage. Moreover, depending on the rate of glass flow into the end cap and the subsequent flow rate out of a leak in the end cap, early repair of the forming body or surrounding equipment may be required.

The amount of glass that collects in the end cap can be dependent on various factors, such as the amount of time the glass is in a low viscosity state, e.g., less than about 35,000 poise, the tightness of fit of the end cap, the depth of the isopipe trough, the angle of the weirs (as machined or as a function of process down tilts), and/or the process temperature (which can affect the expansion difference between the materials). For example, an end cap may not be attached or sealed to the isopipe other than by a tight mechanical fit. A slot can thus exist between the end cap and the isopipe as large as about 0.04 cm (0.015"). Molten glass having a viscosity of less than about 35,000 poise can flow through a 0.04 cm slot. Moreover, due to the gradual decline of the weirs from the delivery end to the compression end at a constant angle, e.g., a 6 degree angle, the top surface of the isopipe at the end cap region can be below the head level of the glass at the compression end. This can provide additional pressure for the glass to flow through the gaps or slots. Once the glass flows through the gaps or slots, it can flow into the end cap and over the end of the isopipe, resulting in one or more of the disadvantages discussed above.

Previous attempts to limit equipment damage, production loss, and/or glass damage due to gobs have included implementation of gob collection devices within the manufacturing system. However, gob collecting can upset operating parameters, such as thermal and/or mass balance, particularly in the case of glass forming processes for thin (e.g., less than about 0.3 mm) glass sheets. Frequency of flushing can, for instance, be increased to compensate for glass conversions and/or liquidus devit issues in high-precision glasses. Processes using longer and/or more frequent flushing can suffer from increased frequency and/or amount of glass leakage. Thus, thermal impact due to the collection and removal of large end mass using conventional methods can be detrimental to the glass forming process.

Consumer demand for high-performance displays with ever growing size and image quality requirements drives the need for improved manufacturing processes for producing high-quality, high-precision glass sheets. Accordingly, it would be advantageous to provide methods and apparatuses for forming glass ribbons and sheets which can minimize glass defects and/or breakage, as well as reducing equipment damage and process instabilities. In various embodiments, the methods and apparatuses disclosed herein can minimize glass flow into the end cap and over the compression end of the forming body, as well as the formation of gobs, which can minimize or prevent production losses and equipment damage.

SUMMARY

The disclosure relates to apparatuses for producing a glass ribbon, the apparatuses comprising a forming body comprising an upper trough-shaped portion comprising two trough walls and a trough bottom; a lower wedge-shaped portion; a delivery end configured to receive molten glass; and a compression end comprising a curb; and an end cap coupled to the compression end and extending over a top surface of the curb, wherein a height of the curb is greater than a height of the two trough walls at a point proximate the compression end. Fusion draw machines comprising such forming body apparatuses are also disclosed herein.

Further disclosed herein are methods for producing a glass ribbon, the methods comprising melting batch materials to form molten glass and introducing the molten glass into an apparatus comprising a forming body comprising an upper trough-shaped portion comprising two trough walls and a trough bottom; a lower wedge-shaped portion comprising two opposing outer surfaces converging at a root; a delivery end configured to receive the molten glass; and a compression end comprising a curb; and an end cap coupled to the compression end and extending over a top surface of the curb, wherein a height of the curb is greater than a height of the two trough walls at a point proximate the compression end.

In various embodiments, the forming body can comprise a refractory material chosen from zircon, zirconia, alumina, magnesium oxide, silicon carbide, silicon nitride, silicon oxynitride, and combinations thereof. According to some embodiments, the forming body apparatus can further comprise a diverter positioned proximate the curb and attached to the end cap. In certain embodiments, the end cap and/or diverter can comprise a precious metal, such as platinum or platinum-containing alloys, and the end cap and diverter can be welded together. According to further embodiments, the forming body apparatus can comprise an auxiliary filler piece positioned between the curb and the diverter and/or a yoke positioned on top of a surface of the end cap. The curb can, in various non-limiting embodiments, have a height greater than a height of the molten glass at the compression end.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals where possible and in which.

DETAILED DESCRIPTION

Apparatuses

Disclosed herein are apparatuses for producing a glass ribbon, the apparatuses comprising a forming body comprising an upper trough-shaped portion comprising two trough walls and a trough bottom; a lower wedge-shaped portion; a delivery end configured to receive molten glass; and a compression end comprising a curb; and an end cap coupled to the compression end and extending over a top surface of the curb, wherein a height of the curb is greater than a height of the two trough walls at a point proximate the compression end. Fusion draw machines comprising such forming body apparatuses are also disclosed herein.

Figure 1:
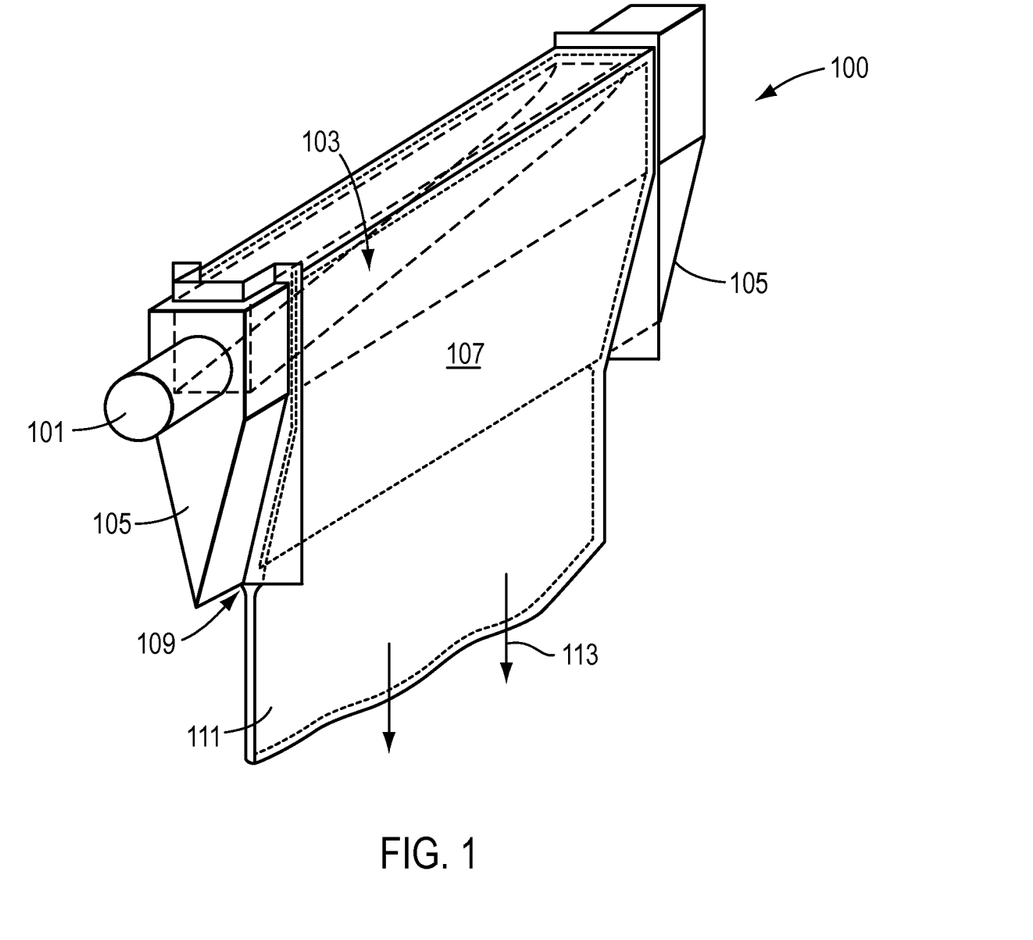
FIG. 1 is a schematic of an exemplary forming body for use in an exemplary fusion draw process for making a glass ribbon.

Embodiments of the disclosure will be discussed with reference to FIGS. 1-2, which depict an exemplary forming body, e.g., isopipe, suitable for use in an exemplary glass manufacturing process for producing a glass ribbon. Referring to FIG. 1, during a glass manufacturing process, such as a fusion draw process, molten glass can be introduced into a forming body 100 comprising a trough 103 via an inlet pipe 101. Once the trough 103 is filled completely, the molten glass can overflow over the sides of the trough and down the two opposing forming surfaces 107 before fusing together at the root 109 to form a glass ribbon 111. The glass ribbon can then be drawn down in the direction 113 using, e.g., a roller assembly (not shown) and further processed to form a glass sheet. The forming body assembly can further comprise ancillary components such as end caps 105 and/or edge directors (not shown).

Figure 2:
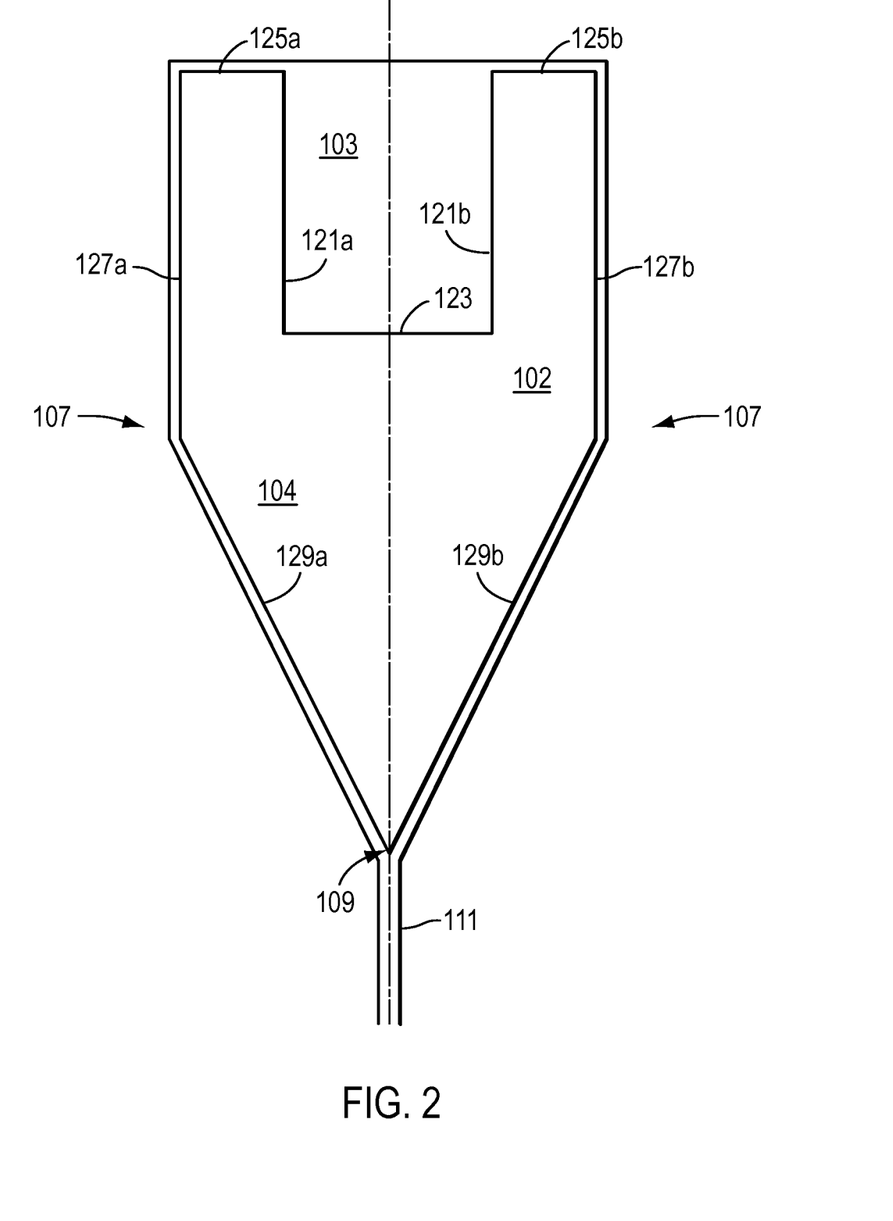
FIG. 2 is a schematic showing a cross-sectional end view of the forming body of FIG. 1.

FIG. 2 provides a cross-sectional view of the forming body assembly of FIG. 1, in which the forming body 100 can comprise an upper trough-shaped part 102 and a lower wedge-shaped part 104. The upper trough-shaped part 102 can comprise a channel or trough 103 configured to receive the molten glass. The trough 103 can be defined by two trough walls (or weirs) 125a, 125b comprising interior surfaces 121a, 121b, and a trough bottom 123. Although the trough is depicted as having a rectangular cross-section, with the interior surfaces forming approximately 90-degree angles with the trough bottom, other trough cross-sections are envisioned, as well as other angles between the interior surfaces and the bottom of the trough. The weirs 125a, 125b can further comprise exterior surfaces 127a, 127b which, together with the wedge outer surfaces 129a, 129b, can make up the two opposing forming surfaces 107. Molten glass can flow over the weirs 125a, 125b and down the forming surfaces 107 as two glass ribbons which can then fuse together at the root 109 to form a unitary glass ribbon 111. The ribbon can then be drawn down in direction 113 and, in some embodiments, further processed to form a glass sheet.

The forming body 100 can comprise any material suitable for use in a glass manufacturing process, for example, refractory materials such as zircon, zirconia, alumina, magnesium oxide, silicon carbide, silicon nitride, silicon oxynitride, and combinations thereof. According to various embodiments, the forming body may comprise a unitary piece, e.g., one piece machined from a single source. In other embodiments, the forming body may comprise two or more pieces bonded, fused, attached, or otherwise coupled together, for instance, the trough-shaped portion and wedge-shaped portion may be two separate pieces comprising the same or different materials. The dimensions of the forming body, including the length, trough depth and width, and wedge height and width, to name a few, can vary depending on the desired application. It is within the ability of one skilled in the art to select these dimensions as appropriate for a particular manufacturing process or system.

Figure 3:
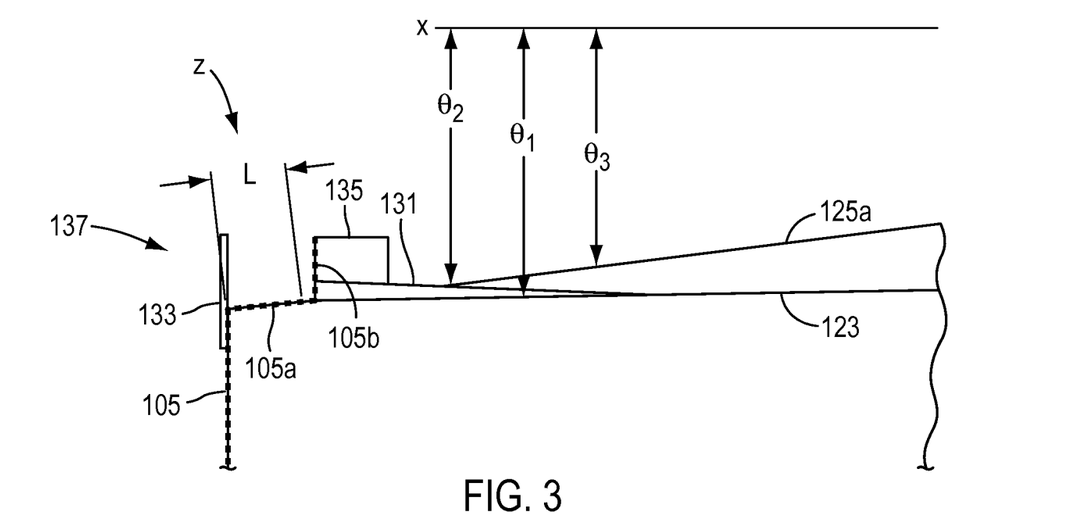
FIG. 3 is a cross-sectional side view of a compression end of an exemplary forming body.

As illustrated in FIG. 3, an exemplary forming body apparatus can be equipped with a diverter 131 disposed on the trough bottom 123. The diverter (e.g., plow) may, in certain embodiments, be generally wedge-shaped, with a width spanning a distance between the interior walls of the trough. The diverter can comprise any material suitable for use in a glass manufacturing process including, but not limited to, precious metals such as platinum and platinum-containing alloys. The forming body apparatus can further comprise an end cap 105, to which the diverter can be welded. The end cap can likewise comprise a precious metal, which can be the same as or different from the material used to construct the diverter. The end cap can further comprise at least one vent tube 133, which can allow air to escape the end cap as it fills with glass. According to various forming body designs, the diverter can also be held in place using at least one weight, which can be positioned in or on the diverter. The weight can comprise any material suitable for use in a glass manufacturing process, for example, refractory materials such as those described above with respect to the forming body, e.g., zircon. The diverter can also comprise an additional component such as a distributor 135, for distributing glass over the two trough walls in a substantially even fashion.

The trough bottom 123 can, in certain embodiments, gradually incline at an angle $\Theta_1$, from the delivery end (not shown) to the compression end 139, with respect to a horizontal axis X of the forming body. This angle can, for instance, range from about 1° to about 3°, such as from about 1.25° to about 2.5°, from about 1.5° to about 2.25°, or from about 1.75° to about 2°, including all ranges and subranges therebetween. As such, in some embodiments, the depth of the trough at the delivery end can be greater than the depth of the trough at the compression end. The depth of the trough can also vary along the length of the isopipe in a linear or non-linear fashion.

The diverter can provide an additional contour on the trough bottom with an incline at an angle $\Theta_2$ ranging, e.g., from about 2° to about 4°, such as from about 2.5° to about 3.75°, from about 2.75° to about 3.5°, or from about 3° to about 3.25°, including all ranges and subranges therebetween. The trough wall(s) 125a (125b not shown) can similarly gradually decline at an angle $\Theta_3$ (e.g., weir angle), from the delivery end (not shown) to the compression end 137, with respect to a horizontal axis X of the forming body. This angle can, for instance, range from about 4° to about 8°, such as from about 4.5° to about 7°, from about 5° to about 6.5°, or from about 5.5° to about 6°, including all ranges and subranges therebetween. According to certain embodiments, the trough sides decline at about a 6° angle with respect to the axis X.

The end cap 105 can be coupled to the compression end 137 (as discussed in more detail below with respect to FIG. 6A), e.g., press fit and/or wrapped around the compression end to form a tight mechanical fit. As such, the forming body apparatus can comprise a region z, having a length L and a substantially flat surface upon which the end cap material, e.g., platinum, can be pressed or wrapped or otherwise coupled. According to various embodiments, the length L of region z can range from about 1 cm to about 15 cm, such as from about 2 cm to about 12 cm, from about 3 cm to about 10 cm, from about 4 cm to about 9 cm, from about 5 cm to about 8 cm, or from about 6 cm to about 7 cm, including all ranges and subranges therebetween. In other embodiments, the region z can be disposed at an angle, e.g., $\Theta_3$, relative to the horizontal axis X.

Region z can, in certain embodiments, begin at the intersection of the weir angle $\Theta_3$ and the trough bottom angle $\Theta_1$. Moreover, region z can also continue to gradually decline at an angle similar to or the same as the weir angle $\Theta_3$, e.g., the trough bottom and the trough sides can have substantially the same height, forming a substantially flat surface (which can be at an angle $\Theta_3$) to which the end cap 105 can be coupled. The end cap 105 can thus comprise a first portion 105a in contact with a surface of region z, and a second portion 105b, extending vertically, to which the diverter 131 can be welded or otherwise attached. While the second portion 105b is depicted at a 90° angle with respect to the horizontal axis X, it is to be understood that this portion can extend vertically at any angle with respect to the axis X or with respect to the trough bottom angle $\Theta_1$.

As previously discussed, while the end cap can be coupled to the compression end and may thus be in physical contact with the forming body, it may not be sealed or otherwise attached to the forming body. As such, a gap may exist between the end cap and the forming body that can be as large as about 0.04 cm, such as about 0.038 cm, 0.035 cm, 0.03 cm, 0.025 cm, 0.02 cm, 0.015 cm, or 0.01 cm, including all ranges and subranges therebetween. Moreover, the expansion of the end cap material, e.g., platinum, with increasing temperatures can be greater than the expansion of the forming body material, e.g., zircon, which can, in various embodiments, cause any gaps between the end cap and the forming body to increase in size.

Figure 4:
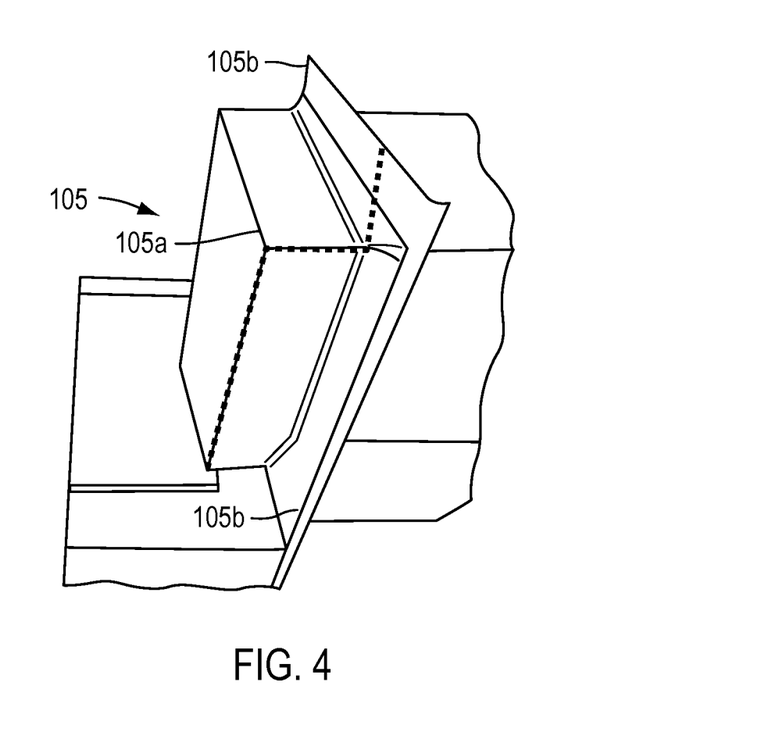
FIG. 4 is a side view of an exemplary end cap.

FIG. 4 depicts a slightly angled side view of an end cap coupled to the compression end of an exemplary forming body. This view provides additional perspective with respect to the potential fit of the end cap on the compression end. As depicted in the illustrated embodiment, the end cap 105 can be imagined as being snugly wrapped around and conforming to the shape of the compression end. A first portion 105*a* extends over a portion of the compression end, e.g., the top and side surfaces of the compression end (not labeled). The first portion can provide a press fit or mechanical coupling to the forming body. A second portion 105*b* extends radially from the forming body, e.g., vertically from the top surface of the forming body and horizontally from the side surfaces of the forming body. The second portion can provide a platform to which a diverter or other component (not shown) can be attached. As such, though not visible from the cross-sectional views provided in FIGS. 3 and 5-7, it is possible for the end cap 205 to extend radially in all directions, e.g., vertically from the top surface, horizontally from the side surfaces, e.g., trough sides, and so on. The end cap material radially extending in this manner can form any angle with the surface from which it extends, for example, about a 90° angle, as depicted in FIG. 4.

Figure 5:
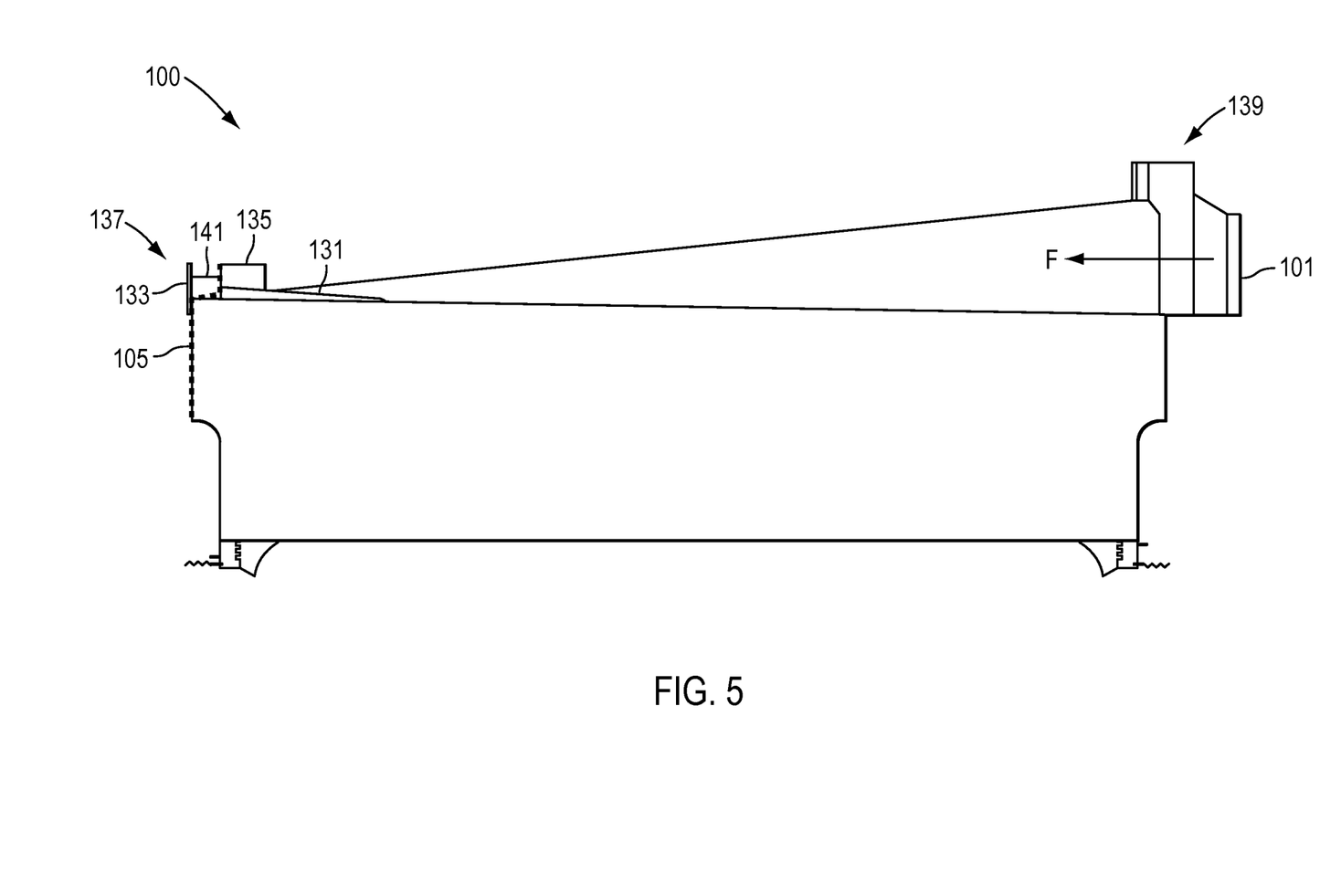
FIG. 5 is a cross-sectional side view of an exemplary forming body.
Figure 6:
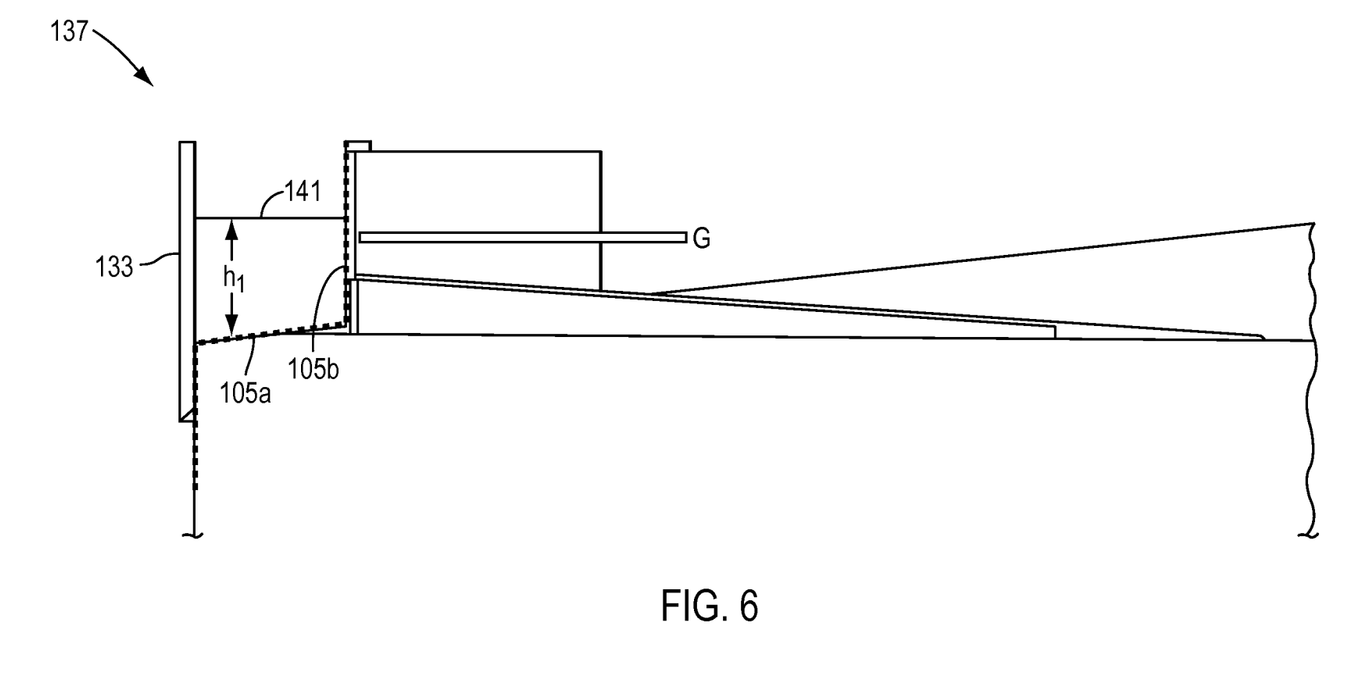
FIG. 6 is a cross-sectional side view of a compression end of the forming body of FIG. 5.

FIG. 5 depicts a cross-sectional side view of another exemplary forming body. The forming body 100 can comprise a delivery end 139, which can comprise an inlet 101 through which glass can flow in direction F. The compression end 137, much like the forming body depicted in FIG. 3, can comprise a diverter 131, which can comprise a distributor 135, and can be welded to an end plate 105, which can comprise a vent tube 133. Additionally, the end cap 105 can be held down by a yoke 141, which can comprise any material suitable for use in a glass manufacturing process, for example, refractory materials such as zircon. As shown in FIG. 6, which provides a more detailed view of the compression end 137 of FIG. 5, the yoke 141 can rest on or otherwise physically contact the first portion 105*a* of the end cap and can abut or otherwise physically contact the second portion 105*b* of the end cap. The yoke 141 can also, in certain embodiments, abut or physically contact the vent tube 133. Further, as depicted in FIG. 6, the yoke 141 may have a height $h_1$ such that, in various embodiments, the yoke is taller than a glass level G at the compression end 137 of the forming body.

Due to the height of the yoke 141, the glass may not spill over the top of the compression end of the forming body in this forming body design. However, this design still relies on the mechanical strength of the end cap to catch and retain any leaking glass and may not address the flow of glass into the end cap itself. As discussed above, if the mechanical strength of the end cap is compromised, e.g., a leak or hole is formed, the subsequent flow of glass through the end cap and down into the primary glass flow ("gobs") can present numerous disadvantages.

Figure 7:
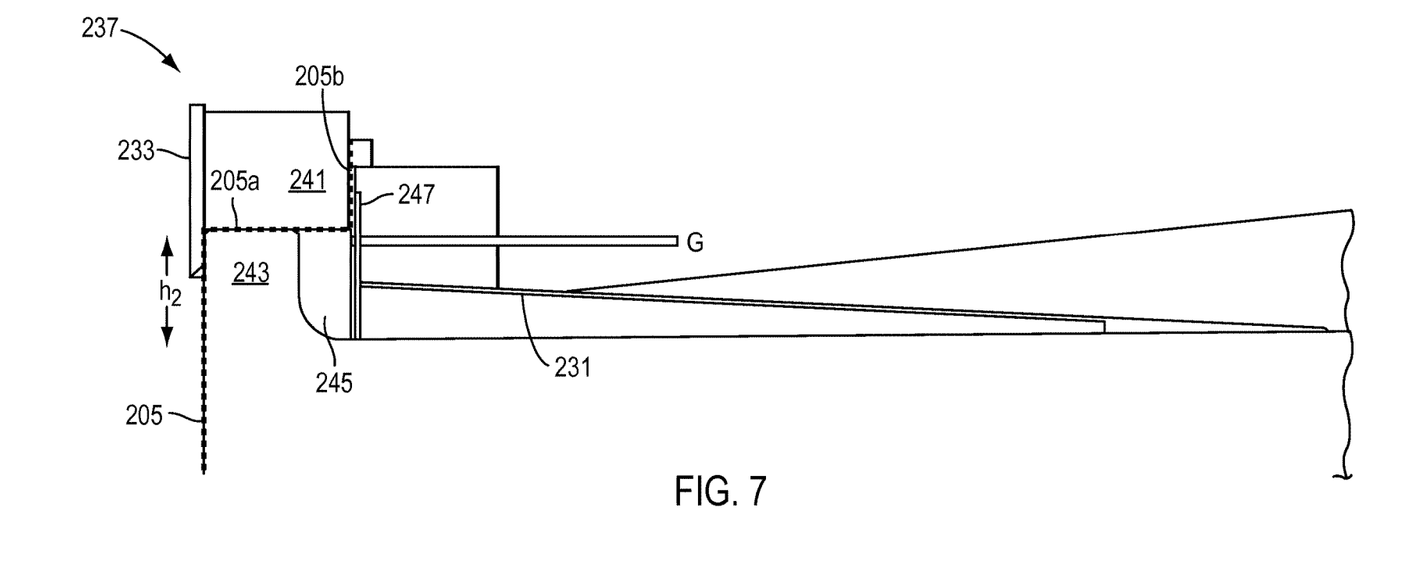
FIG. 7 is a cross-sectional side view of a compression end of a forming body apparatus according to embodiments of the disclosure.

FIG. 7 depicts an alternative design for the compression end 237 of a forming body apparatus according to embodiments of the disclosure. In the illustrated non-limiting design, the forming body can comprise a curb or dam 243, having a height $h_2$ such that the curb is taller than a glass level G at the compression end 237. In various embodiments, the height $h_2$ of the curb may be greater than a height of the trough walls (not labeled) at the compression end, e.g. at a point proximate the compression end 237. According to certain embodiments of the disclosure, the height $h_2$ of the curb can range from 5 cm to about 15 cm, such as from about 6 cm to about 12 cm, from about 7 cm to about 10 cm, or from about 8 cm to about 9 cm, including all ranges and subranges therebetween. The end cap 205 can thus extend around the compression end 237, for example, at least extending over a portion of the top surface of the curb 243 as illustrated in FIG. 7. In various embodiments, the end cap 205 can be positioned between the curb 243 and a yoke 241, which can rest on or otherwise physically contact a surface of the end cap, such as the portion of the end cap in contact with the curb. As in FIGS. 5-6, the end cap 205 can further comprise at least one vent tube 233.

Figure 8:
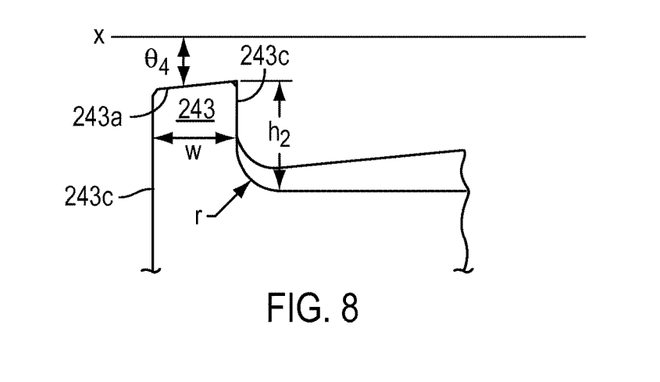
FIG. 8 is a cross-sectional side view of a portion of the compression end of the forming body apparatus of FIG. 7.

The surfaces of the curb 243 are depicted and labeled in FIG. 8. As illustrated, the curb 243 may be machined or otherwise shaped to have at least one surface having a radius of curvature. The top surface 243*a* can, for example, have a radius of curvature, such as a rounding of the edges or corners with a radius of curvature of about 0.5 cm or less. The top surface 243*a* can also, in additional embodiments, be disposed at an angle $\Theta_4$ relative to a horizontal axis X of the forming body apparatus. According to various embodiments of the disclosure, this angle $\Theta_4$ can range from 0° to about 10° and/or $\Theta_4$ can be similar or equal to the weir angle (see $\Theta_3$ in FIG. 3). Thus, in non-limiting embodiments, the top surface 243*a* can be disposed at an angle ranging from about 4° to about 8°, such as about 6°. One or more corners or edges of the exterior surface 243*b* may also be similarly machined to have a radius of curvature. The exterior surface 243*b* can be a terminal end of the forming body and can also be in physical contact with the end cap (not shown).

Furthermore, an interior surface 243*c* of the curb can be non-planar as depicted in FIG. 8. The interior surface 243*c* can make up an interior surface of the trough (not labeled). A radius of curvature r of the interior surface 243*c* can vary as desired for a particular application, e.g., to minimize stress concentrations, and can range, in some embodiments, from about 1 cm to about 3 cm, such as from about 1.5 cm to about 2 cm, including all ranges and subranges therebetween. Of course, while the various surfaces of the curb are depicted in FIGS. 7-8 as disposed at various angles and/or having various degrees of curvature, it is to be understood that any combination of these features can be used as desired. For instance, the curb can be machined or otherwise shaped to have only planar surfaces, e.g., a rectangular or square curb, although such embodiments may have increased stress points as compared to curbs with non-planar surfaces and/or the manufacturing costs for producing the forming body may be higher.

Referring back to FIG. 7, in the case of a non-planar interior curb surface (not labeled), one or more auxiliary filler pieces 245 may be used to fill a cavity that may otherwise be formed between the radius of curvature and the diverter 231. These filler pieces 245 may be machined from a separate piece of refractory material, e.g., zircon, and subsequently bonded or otherwise coupled to the forming body adjacent the curb 243. Similarly, while the forming body comprising the curb 243 is illustrated as a unitary body (e.g., machined from a single piece of material), the curb can likewise be machined from a separate piece of refractory material and subsequently bonded or otherwise attached to the compression end of the forming body. In additional embodiments, the material forming the filler or end piece(s) can include a material that does not react with platinum (or other metals) to minimize leakage risk of any glass in the end cap. In such embodiments, for example, a second end cap comprising, e.g., a refractory material similar to or the same as the material used to construct the isopipe, could be installed adjacent and exterior the metal end cap and could further support the metal of the end cap and restrict the ability of the end cap to billow out and collect glass.

The end cap 205 can be coupled to the compression end, including the curb 243, for instance, a first portion 205*a* can extend around or across various curb surfaces, such as the exterior, top, and/or side surfaces (not labeled) of the curb, and a second portion 205*b* can extend radially from various surfaces of the forming body, e.g., vertically from the top surface of the curb and horizontally from the trough side surfaces. The diverter or plow 231 may be attached at least in part to the end cap 205. For instance, the diverter 231 can be welded to the second portion 205b of the end cap. Attachment (or welding) of the diverter to the end cap can be achieved using a variety of configurations and methods. Notably, as depicted in FIG. 7, the end cap 205, e.g., the second portion 205b may, in some embodiments, not cover the interior surface (not labeled) of the curb 243. The diverter, however, can, in various embodiments, have a height the same as or shorter than the curb. Thus, an auxiliary plate 247 may be welded to one or more surfaces of the end cap 205, such that the plate extends downward to cover at least a portion of the interior surface of the curb. The diverter 243 can then be welded to the auxiliary plate 247 and thus attached to the end cap 205. The auxiliary plate can be constructed of any suitable material, for instance, a precious metal such as platinum or platinum-containing alloys. Of course, in other embodiments, the diverter may have one or more dimensions allowing for direct attachment, or welding, to the end plate.

Figure 9A:
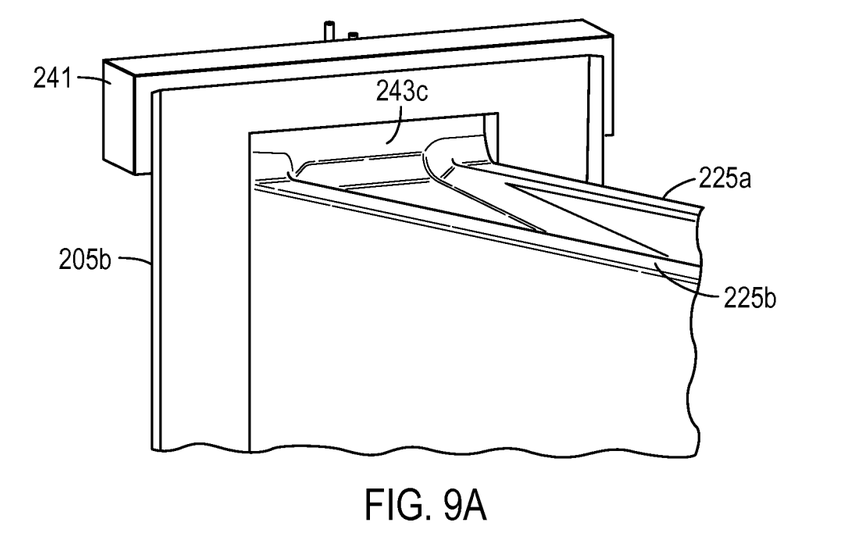
FIGS. 9A-B depict internal views of a compression end of a forming body apparatus according to embodiments of the disclosure.
Figure 9B:
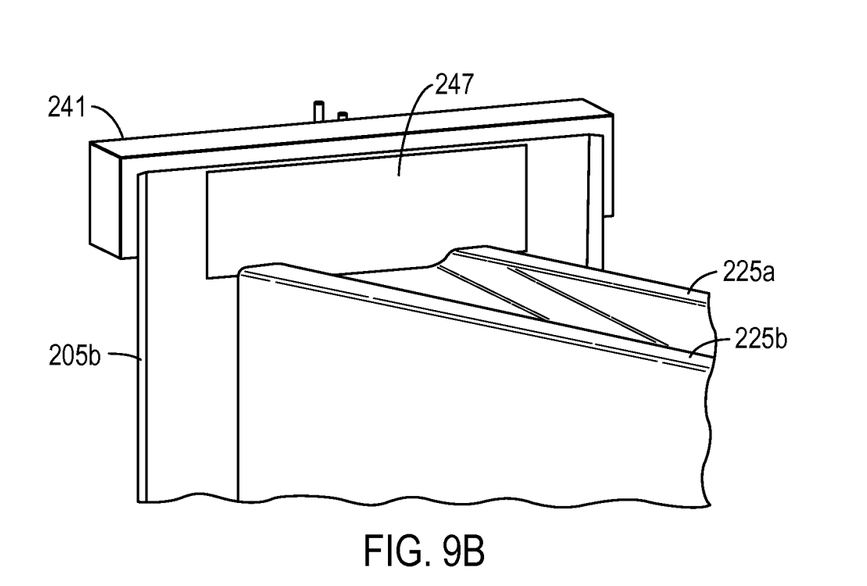

FIGS. 9A-B provide internal perspective views of the compression end of a forming body apparatus according to the instant disclosure. In FIG. 9A, the second portion 205b of the end curb is visible, and a yoke 241 is positioned on top of the first portion of the end cap (not visible). The interior surface 243c of the curb is visible and not covered by end cap material. The top of the curb (not labeled) is in contact with the first portion of the end cap and is located above the height of the trough side walls 225a, 225b. In FIG. 9B, the interior surface of the curb is not visible and is covered by an auxiliary plate 247. A diverter or other component (not shown) can then be welded or otherwise attached to the auxiliary plate 247. Of course, as mentioned above, other configurations and methods for attaching the diverter to the end cap are possible and the depicted embodiment should not be considered to be limiting on the appended claims. Additional embodiments can provide an exemplary isopipe having certain dimensions of the weir and trough matching for a predetermined length behind the plow to minimize glass flow into a respective end cap.

Methods

Disclosed herein are methods for producing a glass ribbon, the methods comprising melting batch materials to form molten glass and introducing the molten glass into an apparatus comprising a forming body comprising an upper trough-shaped portion comprising two trough walls and a trough bottom; a lower wedge-shaped portion comprising two opposing outer surfaces converging at a root; a delivery end configured to receive the molten glass; and a compression end comprising a curb; and an end cap coupled to the compression end and extending over a top surface of the curb, wherein a height of the curb is greater than a height of the two trough walls at a point proximate the compression end.

Embodiments of the disclosure will be discussed with reference to FIG. 10, which depicts an exemplary glass manufacturing system 300 for producing a glass ribbon 304. The glass manufacturing system 300 can include a melting vessel 310, a melting to fining tube 315, a fining vessel (e.g., finer tube) 320, a fining to stir chamber connecting tube 325 (with a level probe stand pipe 327 extending therefrom), a stir chamber (e.g., mixing vessel) 330, a stir chamber to bowl connecting tube 335, a bowl (e.g., delivery vessel) 340, a downcomer 345, and a FDM 350, which can include an inlet 355, a forming body (e.g., isopipe) 360, and a pull roll assembly 365.

Glass batch materials can be introduced into the melting vessel 310, as shown by arrow 312, to form molten glass 314. The fining vessel 320 is connected to the melting vessel 310 by the melting to fining tube 315. The fining vessel 320 can have a high temperature processing area that receives the molten glass from the melting vessel 310 and which can remove bubbles from the molten glass. The fining vessel 320 is connected to the stir chamber 330 by the fining to stir chamber connecting tube 325. The stir chamber 330 is connected to the bowl 340 by the stir chamber to bowl connecting tube 335. The bowl 340 can deliver the molten glass through the downcomer 345 into the FDM 350.

The FDM 350 can include an inlet 355, a forming body 360, and a pull roll assembly 365. The inlet 355 can receive the molten glass from the downcomer 345, from which it can flow to the forming body apparatus 360, where it is formed into a glass ribbon 304. Various embodiments of the forming body apparatus 360 are further described above, e.g., with reference to FIGS. 1-9. The pull roll assembly 365 can deliver the drawn glass ribbon 304 for further processing by additional optional apparatuses. For example, the glass ribbon can be further processed by a traveling anvil machine (TAM), which can include a mechanical scoring device for scoring the glass ribbon. The scored glass can then be separated into pieces of glass sheet, machined, polished, chemically strengthened, and/or otherwise surface treated, e.g., etched, using various methods and devices known in the art.

The term "batch materials" and variations thereof are used herein to denote a mixture of glass precursor components which, upon melting, react and/or combine to form a glass. The glass batch materials may be prepared and/or mixed by any known method for combining glass precursor materials. For example, in certain non-limiting embodiments, the glass batch materials can comprise a dry or substantially dry mixture of glass precursor particles, e.g., without any solvent or liquid. In other embodiments, the glass batch materials may be in the form of a slurry, for example, a mixture of glass precursor particles in the presence of a liquid or solvent.

According to various embodiments, the batch materials may comprise glass precursor materials, such as silica, alumina, and various additional oxides, such as boron, magnesium, calcium, sodium, strontium, tin, or titanium oxides. For instance, the glass batch materials may be a mixture of silica and/or alumina with one or more additional oxides. In various embodiments, the glass batch materials comprise from about 45 to about 95 wt % collectively of alumina and/or silica and from about 5 to about 55 wt % collectively of at least one oxide of boron, magnesium, calcium, sodium, strontium, tin, and/or titanium.

Figure 10:
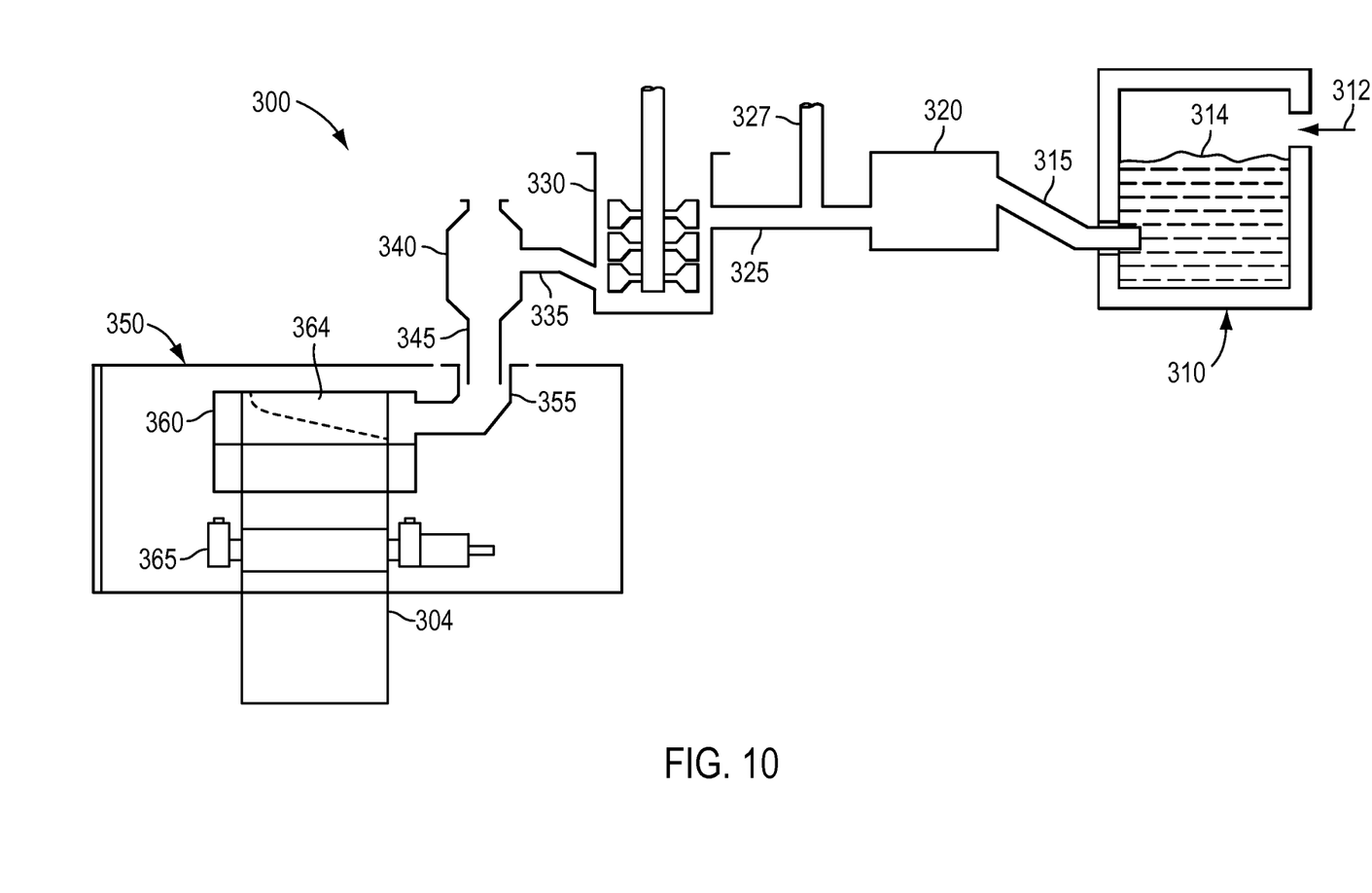
FIG. 10 is a schematic of an exemplary glass manufacturing system.

The batch materials can be melted according to any method known in the art, including the methods discussed herein with reference to FIG. 10. For example, the batch materials can be added to a melting vessel and heated to a temperature ranging from about 1100° C. to about 1700° C., such as from about 1200° C. to about 1650° C., from about 1250° C. to about 1600° C., from about 1300° C. to about 1550° C., from about 1350° C. to about 1500° C., or from about 1400° C. to about 1450° C., including all ranges and subranges therebetween. The batch materials may, in certain embodiments, have a residence time in the melting vessel ranging from several minutes to several hours, depending on various variables, such as the operating temperature and the batch size. For example, the residence time may range from about 30 minutes to about 8 hours, from about 1 hour to about 6 hours, from about 2 hours to about 5 hours, or from about 3 hours to about 4 hours, including all ranges and subranges therebetween.

The molten glass can subsequently undergo various additional processing steps, including fining to remove bubbles, and stirring to homogenize the glass melt, to name a few. The molten glass can then be processed to produce a glass ribbon using the forming body apparatuses disclosed herein. For example, as discussed above, the molten glass can be introduced into the trough-shaped portion of the forming body at the delivery end via one or more inlets. The glass can flow in a direction proceeding from the delivery end to the compression end, over the two trough walls, and down the two opposing outer surfaces of the wedge-shaped portion, converging at the root to form a unitary glass ribbon.

By way of a non-limiting example, the forming body apparatus may be enclosed in a vessel operating at a temperature ranging, at its hottest point (e.g., in an upper "muffle" region proximate the trough-shaped portion), from about 1100° C. to about 1350° C., such as from about 1150° C. to about 1325° C., from about 1150° C. to about 1300° C., from about 1175° C. to about 1250° C., or from about 1200° C. to about 1225° C., including all ranges and subranges therebetween. At its coolest point (e.g., in a lower "transition" region proximate the root of the forming body), the vessel may operate at a temperature ranging from about 800° C. to about 1250° C., such as from about 850° C. to about 1225° C., from about 900° C. to about 1200° C., from about 950° C. to about 1150° C., or from about 1000° to about 1100° C., including all ranges and subranges therebetween.

The methods and apparatuses disclosed herein may provide one or more advantages over prior art forming body assemblies. In certain embodiments, the apparatuses disclosed herein can reduce or eliminate gobs caused by glass leaking into and out of the end cap on the compression end. Gob reduction can improve yield by reducing the amount of rubicons from glass gobs falling into the process stream. Additionally, when glass gobs grow large, they can change the local thermodynamics of the system such that there is a difference in temperature when the gobs are present and when they are not present. Eliminating or reducing gob formation can therefore improve the thermodynamic stability of a glass manufacturing system employing the disclosed apparatuses. Moreover, by reducing glass flow over the compression end, the disclosed apparatuses can improve or increase glass flow over the trough sides proximate the compression end, thus possibly improving glass ribbon uniformity and/or reducing material waste. Finally, because the instant methods and apparatuses can reduce or eliminate glass flow into the end cap and thus any subsequent damage to the end cap due to excessive glass volume, damage to the forming body apparatus and the surrounding equipment can be minimized as well as process down time for repairs, thereby improving manufacturing speed and efficiency. Of course, it is to be understood that the methods and apparatuses disclosed herein may not have one or more of the above advantages, but such methods and apparatuses are intended to fall within the scope of the appended claims.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a component" includes examples having two or more such components unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. Moreover, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An apparatus for producing a glass ribbon, comprising:
   a forming body comprising:
      an upper trough-shaped portion comprising two trough walls and a trough bottom, the upper trough-shaped portion defining a trough that is bounded by the two trough walls and the trough bottom, the trough configured to receive molten glass between the two trough walls and on the trough bottom;
      a lower wedge-shaped portion;
      a delivery end configured to receive the molten glass;
      a compression end comprising a curb; and a diverter positioned within the trough in contact with the trough bottom and between the two trough walls, the diverter comprising a width spanning a distance between the two trough walls of the upper trough-shaped portion; and
an end cap coupled to the compression end and extending over the curb,
wherein a height of the curb is greater than a height of the two trough walls at the compression end, the diverter attached to the end cap;
wherein the diverter is attached to an auxiliary plate attached to the end cap, further wherein upper surfaces of the two trough walls extend along a plane, a first portion of the diverter located on a first side of the plane and a second portion of the diverter located on an opposing second side of the plane.

2. The apparatus of claim 1, wherein the end cap and diverter comprise a precious metal and wherein the diverter is welded to the end cap, further wherein an axis intersects the two trough walls and the diverter and passes through the trough.

3. The apparatus of claim 1, further comprising an auxiliary filler piece positioned between the curb and the diverter.

4. The apparatus of claim 3, wherein the auxiliary filler piece is positioned on the trough bottom between the two trough walls adjacent to an interior surface of the curb.

5. The apparatus of claim 1, further comprising a yoke positioned on top of a portion of the end cap extending over the curb.

6. The apparatus of claim 1, wherein a height of the two trough walls declines at a constant angle from the delivery end to the compression end, relative to a horizontal axis of the forming body.

7. The apparatus of claim 1, wherein a dimension of the two trough walls and a dimension of the trough bottom are substantially matched along a predetermined length of the forming body between the diverter and the end cap.

8. The apparatus of claim 1, wherein a depth of the upper trough-shaped portion varies from the delivery end to the compression end, in a linear or non-linear fashion.

9. The apparatus of claim 1, wherein a first depth of the upper trough-shaped portion at the delivery end is greater than a second depth of the upper trough-shaped portion at the compression end.

10. The apparatus of claim 1, further comprising a second end cap coupled to the end cap, the second end cap comprising a refractory material.

11. The apparatus of claim 1, wherein the forming body comprises a refractory material chosen from zircon, zirconia, alumina, magnesium oxide, silicon carbide, silicon nitride, silicon oxynitride, and combinations thereof.

12. A fusion draw machine comprising a forming body comprising: an upper trough-shaped portion comprising two trough walls and a trough bottom, the upper trough-shaped portion defining a trough that is bounded by the two trough walls and the trough bottom, the trough configured to receive molten glass between the two trough walls and on the trough bottom; a lower wedge-shaped portion; a delivery end configured to receive the molten glass; a compression end comprising a curb; and a diverter positioned within the trough in contact with the trough bottom and between the two trough walls, the diverter comprising a width spanning a distance between the two trough walls of the upper trough-shaped portion; and an end cap coupled to the compression end and extending over the curb, wherein a height of the curb is greater than a height of the two trough walls at the compression end, the diverter attached to the end cap; wherein the diverter is attached to an auxiliary plate attached to the end cap, further wherein upper surfaces of the two trough walls extend along a plane, a first portion of the diverter located on a first side of the plane and a second portion of the diverter located on an opposing second side of the plane.

13. A method for producing a glass ribbon, comprising:
melting batch materials to form molten glass; and
introducing the molten glass into an apparatus comprising:
a forming body comprising:
an upper trough-shaped portion comprising two trough walls and a trough bottom, the upper trough-shaped portion defining a trough that is bounded by the two trough walls and the trough bottom, the trough configured to receive the molten glass between the two trough walls and on the trough bottom;
a lower wedge-shaped portion comprising two opposing outer surfaces converging at a root;
a delivery end configured to receive the molten glass; and
a compression end comprising a curb; and
an end cap coupled to the compression end and extending over the curb, wherein a height of the curb is greater than a height of the two trough walls at the compression end; and
directing the molten glass out of the upper trough-shaped portion and over the two trough walls with a diverter positioned within the trough in contact with the trough bottom and between the two trough walls; wherein the diverter is attached to an auxiliary plate attached to the end cap.

14. The method of claim 13, wherein the molten glass is introduced into the upper trough-shaped portion of the forming body and flows from the delivery end to the compression end, over the two trough walls, and down the two opposing outer surfaces of the lower wedge-shaped portion, converging at the root to form a unitary glass ribbon.

15. The method of claim 13, wherein the diverter is attached to the end cap.

16. The method of claim 15, wherein the end cap and diverter comprise a precious metal and wherein the diverter is welded to the end cap.

17. The method of claim 13, wherein the curb has a height greater than a height of the molten glass at the compression end.

18. An apparatus for producing a glass ribbon, comprising:
a forming body comprising:
an upper trough-shaped portion comprising two trough walls and a trough bottom;
a lower wedge-shaped portion;
a delivery end configured to receive molten glass;
a compression end comprising a curb; and
a diverter positioned on the trough bottom between the two trough walls, the diverter forming an angle relative to the trough bottom within a range from about 2° to about 4°; and
an end cap coupled to the compression end and extending over the curb,
wherein a height of the curb is greater than a height of the two trough walls at the compression end.

* * * * *